(12) United States Patent
Jing et al.

(10) Patent No.: US 11,438,389 B2
(45) Date of Patent: Sep. 6, 2022

(54) SYSTEMS AND METHODS FOR ENHANCED MESSAGING FOR NETWORK- AND USER EQUIPMENT-IMPLEMENTED CALL REQUEST HANDLING

(71) Applicant: Verizon Patent and Licensing Inc., Arlington, VA (US)

(72) Inventors: Yi Jing, Belmont, MA (US); Timothy M. Dwight, Richardson, TX (US); Lulia Ann Barakat, McKinney, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/865,614

(22) Filed: May 4, 2020

(65) Prior Publication Data
US 2021/0344730 A1    Nov. 4, 2021

(51) Int. Cl.
| | |
|---|---|
| *H04L 65/1076* | (2022.01) |
| *H04L 65/1016* | (2022.01) |
| *H04L 65/1063* | (2022.01) |
| *H04L 65/1104* | (2022.01) |

(52) U.S. Cl.
CPC ...... *H04L 65/1079* (2013.01); *H04L 65/1016* (2013.01); *H04L 65/1063* (2013.01); *H04L 65/1104* (2022.05)

(58) Field of Classification Search
CPC ............. H04L 65/1079; H04L 65/1006; H04L 65/1016; H04L 29/06; H04L 51/12; H04L 65/1063; H04M 3/42

USPC .......................................................... 370/259
See application file for complete search history.

(56) References Cited

U.S. PATENT DOCUMENTS

| | | | |
|---|---|---|---|
| 8,270,588 B2 * | 9/2012 | Schwartz | H04M 3/436 |
| | | | 379/210.02 |
| 10,009,461 B2 | 6/2018 | Ansari | |
| 10,313,516 B2 | 6/2019 | Ansari | |
| 2004/0249951 A1 * | 12/2004 | Grabelsky | H04L 67/36 |
| | | | 709/227 |
| 2008/0084975 A1 * | 4/2008 | Schwartz | H04M 3/436 |
| | | | 379/88.22 |
| 2013/0230042 A1 * | 9/2013 | Shatsky | H04L 65/105 |
| | | | 370/352 |
| 2015/0312295 A1 * | 10/2015 | Allen | H04L 65/4046 |
| | | | 709/204 |
| 2017/0104875 A1 * | 4/2017 | Im | H04M 3/5191 |
| 2017/0295536 A1 * | 10/2017 | Kim | H04L 47/2475 |

(Continued)

*Primary Examiner* — Brian Whipple
*Assistant Examiner* — Tony Williams

(57) ABSTRACT

A system described herein may provide a technique for handling call requests, prior to the performance of a call setup procedure, based on attributes of a calling User Equipment ("UE") and/or a called UE. A Messaging Application Server may receive a call request, from the calling UE and to the called UE, identify a category or event type associated with the call request, and notify the called UE of the call request, including the category or event type. Different categories or event types may be associated with different sets of eligible actions to perform. The called UE may indicate a particular action, associated with the identified category or event type, and the MAS may handle the call request according to the particular action (e.g., reject the call request or proceed with a call setup procedure).

20 Claims, 12 Drawing Sheets

(56) References Cited

U.S. PATENT DOCUMENTS

2017/0302794 A1* 10/2017 Spievak .............. H04M 3/2281
2018/0103497 A1* 4/2018 Chiang ............... H04L 65/1069

* cited by examiner

400

| SIP NOTIFY Event type | Responses/actions |
|---|---|
| Call | `<null>` |
| Spam_0 | `<null>` |
| Spam_70 | - Block: Do not allow call<br>- BlockNotify: Do not allow call, notify caller that call was blocked<br>- Allow: Allow call |
| Spam_90 | - Block: Do not allow call<br>- Allow: Allow call |
| EnhCall | - Block: Do not allow call<br>- Block1: Do not allow call, notify caller with first preset message<br>- Block2: Do not allow call, notify caller with second preset message<br>- BlockCustom: Do not allow call, notify caller with custom message<br>- Allow: Allow call |
| NwDND | - BlockDND: Do not allow call, notify caller that callee has "Do not disturb" feature activated<br>- Allow: Allow call |
| InfoRobocall | - Block: Do not allow call<br>- BlockTranscribe: Answer call, email transcription of call to user<br>- Allow: Allow call |

SYSTEMS AND METHODS FOR ENHANCED MESSAGING FOR NETWORK- AND USER EQUIPMENT-IMPLEMENTED CALL REQUEST HANDLING

BACKGROUND

Service providers, such as wireless networks, voice call providers, and/or other entities, may offer packet-based messaging or voice call services. Such services may be used in ways that may be undesirable to certain users, such as the use of such services to send unauthorized or undesired communications (e.g., messages, voice calls, or the like). Such communications may sometimes be referred to as "spam." Session Initiation Protocol ("SIP") or other protocols may be used to facilitate or implement such services.

BRIEF DESCRIPTION OF THE DRAWINGS

FIG. 4 illustrates an example data structure that may be used to indicate how certain SIP messaging, in accordance with some embodiments, may be used by a UE to indicate whether a given incoming call should be allowed to be connected to the UE;

DETAILED DESCRIPTION OF THE PREFERRED EMBODIMENTS

The following detailed description refers to the accompanying drawings. The same reference numbers in different drawings may identify the same or similar elements.

Embodiments described herein provide for UE-implemented messaging that allows the UE to specify whether certain incoming calls, for the UE, are allowed to be connected to the UE. For example, as described herein, the UE may utilize received user inputs and/or UE-implemented logic to determine whether a given incoming call for the UE should be allowed or rejected. Such UE-implemented logic may include whether a caller is in an address book associated with the UE, whether the UE is in a UE-implemented "do not disturb" or "no calls" mode, user preferences, and/or other types of functionality described herein. In some embodiments, UE-implemented logic may be used to override a network-implemented determination of an undesirable, or "spam" call, and may thus allow the call to be placed to the UE.

As discussed below, enhanced SIP messaging may be used by a UE, in some embodiments, to indicate whether a given call should be allowed to be connected to the UE or not. For example, in response to a SIP NOTIFY message, indicating that a call has been placed to the UE, the UE may reply with a message (e.g., a SIP 200 OK message) indicating whether the call should be allowed to be placed to the UE. In some embodiments, the reply message (e.g., the SIP 200 OK message) may have different formats or schema, depending on an Event type specified by the SIP NOTIFY message. Such different formats or schema provide for flexible options for allowing or rejecting calls, such as providing customized messages to a caller, and/or differentially allowing or rejecting calls based on different factors, as described herein.

Figure 1:
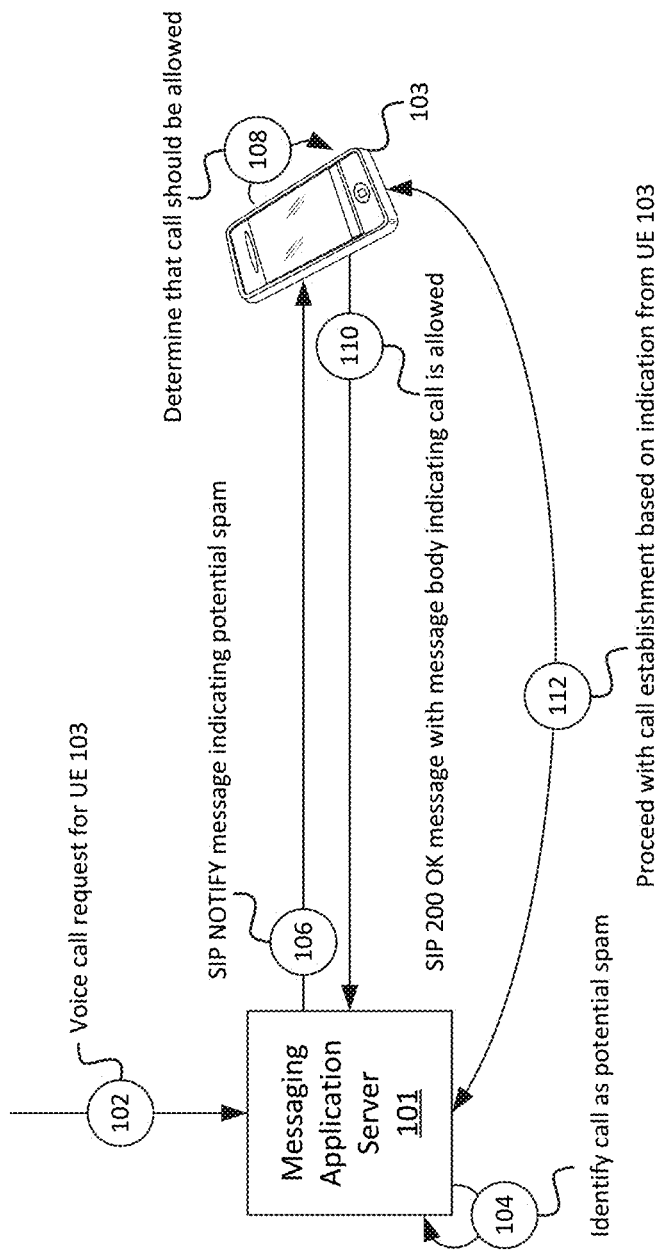
FIG. 1 illustrates an example of a call for a User Equipment ("UE") being identified as potential spam, and the UE using Session Initiation Protocol ("SIP") messaging to override the spam determination and allow the call to be placed to the UE, in accordance with some embodiments.

Referring to FIG. 1, Messaging Application Sever ("MAS") 101 may be a device or system that provides voice call services, including facilitating the establishment of calls between UE 103 and one or more other devices or systems (e.g., another UE). In some embodiments, MAS 101 may utilize SIP messaging and/or some other suitable type of messaging to establish calls and/or provide other types of messages. While not explicitly shown here, MAS 101 may be communicatively coupled with one or more other devices or systems that facilitate call establishment and/or other messaging (e.g., a Call Session Control Function ("CSCF") of an Internet Protocol ("IP") Multimedia Subsystem ("IMS") network).

As shown in FIG. 1, for example, MAS 101 may receive (at 102) a voice call request for UE 103. For example, MAS 101 may receive the voice call request from another UE (referred to as "calling UE" or "caller") based on a call placed, such as via a messaging or telephony application, by the other UE. While not explicitly shown here, the call request may be received via one or more other devices, systems, gateways, etc.

MAS 101 may, in some embodiments, determine whether the call is "spam," prior to notifying UE 103 of the incoming call request. For example, MAS 101 may perform a lookup of an identifier of the caller (e.g., a telephone number from which the call was placed) in a database or other data store that indicates known callers associated with undesirable or malicious calls. In some embodiments, MAS 101 may receive an indication from one or more other devices or systems that perform such analysis. In some embodiments, MAS 101 may generate or receive a score indicating the likelihood or degree of the "spam" nature of the call or the caller (e.g., where differing scores indicate differing likelihoods or degrees of severity of the undesirability of the call). In some embodiments, such analysis may include implementation of a Secure Telephone Identity Revisited and Signature-based Handling of Asserted Information Using Tokens ("STIR/SHAKEN") protocol or other suitable technique to validate the identity of the caller. In some embodiments, one or more other techniques may additionally or alternatively be used to determine whether the call is a "spam" call or not.

In this example, assume that MAS 101 identifies (at 104) that the requested call is a spam call. Accordingly, in accordance with some embodiments, MAS 101 may notify (at 106) UE 103 that a request has been received to place a call to UE 103, and that the call has been identified as spam (or potential spam). For example, MAS 101 may provide a SIP NOTIFY message to UE 103. As discussed below, the SIP NOTIFY message may include an identifier that indicates that a potential spam call request has been received for UE 103. In some embodiments, the identifier may be in the form of an "Event" type indicated in the SIP NOTIFY message. As discussed below, different Event types may be associated with different types of calls or messages, and/or may indicate differing levels of confidence or severity of the undesirable nature of a given call.

In some embodiments, UE 103 may utilize the notification of the potential spam call to determine whether to ultimately allow the call to be placed to UE 103 or not. For example, as discussed below, UE 103 may perform one or more automated processes (e.g., without requesting input from a user, and/or without providing an audible or visual notification based on the notification (received at 106)) to determine whether to allow the call to be placed to UE 103. On the other hand, in some embodiments, UE 103 may request feedback or input from a user to determine whether to allow the call to be placed to UE 103.

In this example, UE 103 may determine (at 108) that the call should be allowed to be placed to UE 103. For example, UE 103 may identify a telephone number of the caller in a local address book stored by UE 103, may perform a lookup to an external database or system based on which UE 103 determines the call is not spam or should otherwise be allowed, may receive input from a user indicating that the call should be allowed, etc.

In accordance with some embodiments, UE 103 may thus output (at 110) an indication, to MAS 101, that the call should be allowed to be placed to UE 103. In some embodiments, this indication may be provided in an acknowledgement message in response to the notification (provided at 106), such as a SIP 200 OK message. The indication output by UE 103 (e.g., the SIP 200 OK message) may include a message body, payload, or other data, indicating how to handle the call request. For example, the indication (e.g., the SIP 200 OK message) may indicate that the call should be rejected or allowed. In some embodiments, as discussed below, the indication may include additional information, such as a message to provide to the caller.

In the example of FIG. 1, the SIP 200 OK message may indicate that the call should be allowed to be placed to UE 103. Accordingly, MAS 101 and UE 103 may proceed (at 112) with a call establishment procedure, in order to connect UE 103 to the caller, based on the call request from the caller. The use of SIP messaging in this manner may enhance the functionality of message flows that utilize SIP messaging (e.g., including SIP NOTIFY and SIP 200 OK messages), by leveraging such messages to further include information that can be used to determine whether to allow or block certain calls. Further, such messaging may facilitate determinations made by UE 103 in the blocking or allowing of calls, without needing to introduce additional messages.

Figure 2:
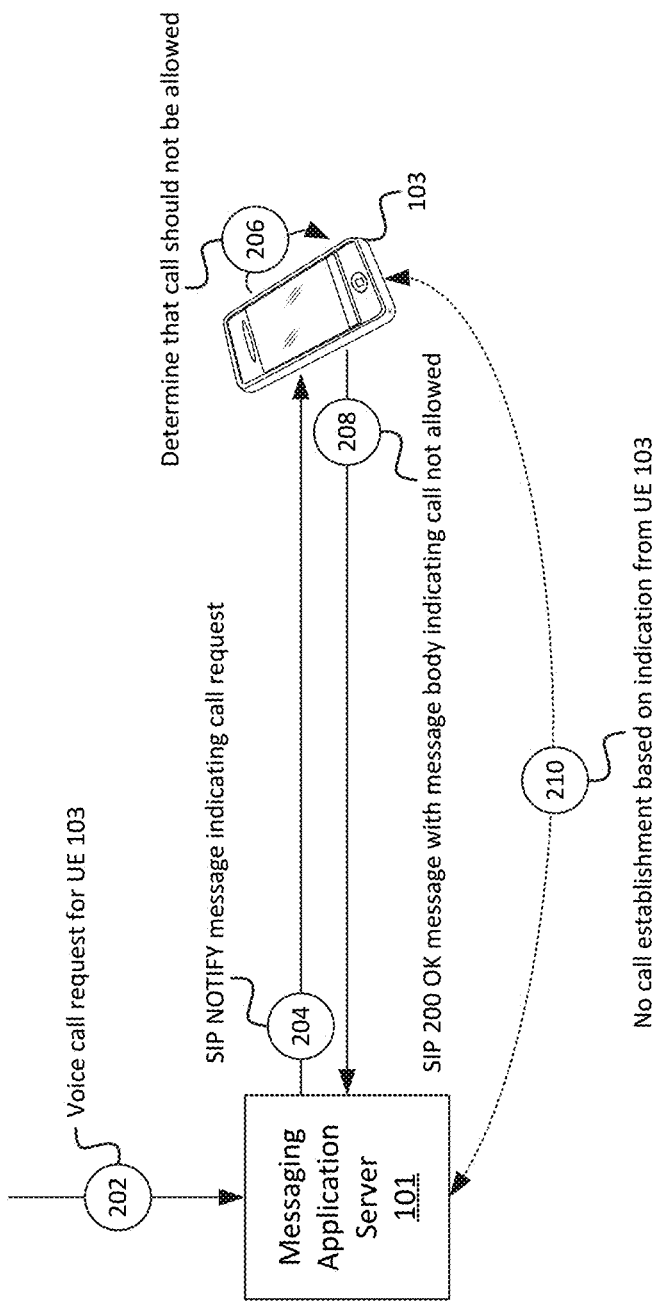
FIG. 2 illustrates an example of a UE using SIP messaging to indicate that an incoming call for the UE should not be connected to the UE, in accordance with some embodiments.

FIG. 2 illustrates an example of UE 103 using SIP messaging to indicate that an incoming call for UE 103 should not be connected, in accordance with some embodiments. For example, as shown, MAS 101 may receive (at 202) a call request for UE 103. In this example, MAS 101 may not have identified the call request as being potential spam. For example, MAS 101 may perform an analysis and, based on the analysis, may identify that the call is not spam, or is not likely to be spam or otherwise undesirable. Alternatively, MAS 101 may forego performing such an analysis (e.g., may not make a determination one way or another regarding whether the call is spam).

Thus, MAS 101 may output (at 204) a notification regarding the call request. Such indication may include a SIP NOTIFY message. The Event type indicated in the SIP NOTIFY message may include an Event type that is not associated with spam calls, may include an Event type that indicates that MAS 101 has determined that the call request is not spam (and/or is not likely to be spam), an Event type that has no indication regarding whether the call request is spam, and/or some other suitable Event type.

In this example, UE 103 may determine (at 206) that the call should not be allowed to be placed to UE 103. For example, UE 103 may include an application or other functionality based on which UE 103 may determine that the call request is spam. In such situations, UE 103 may determine that the call request is spam based on a telephone number associated with the call request not being present in an address book stored by UE 103, and/or may perform a lookup to an external database or other data store (e.g., via the Internet or some other network) to determine that the call request is spam. As another example, UE 103 may be in a "do not disturb" mode, in which all calls are automatically rejected. In some embodiments, UE 103 may present a notification of the call request (e.g., via a graphical user interface ("GUI")), and may receive a user feedback or selection indicating that the call should not be allowed to be placed to UE 103.

Based on determining (at 206) that the call should not be allowed to be placed to UE 103, UE 103 may output (at 208) an indication that the call should not be allowed. For example, this indication may be, or may include, a SIP 200 OK message, with a message body indicating that the call request is rejected or declined (e.g., the requested call should not be placed to UE 103). Based on this indication, MAS 101 and UE 103 may not establish (indicated by dashed line 210) the requested call.

Figure 3:
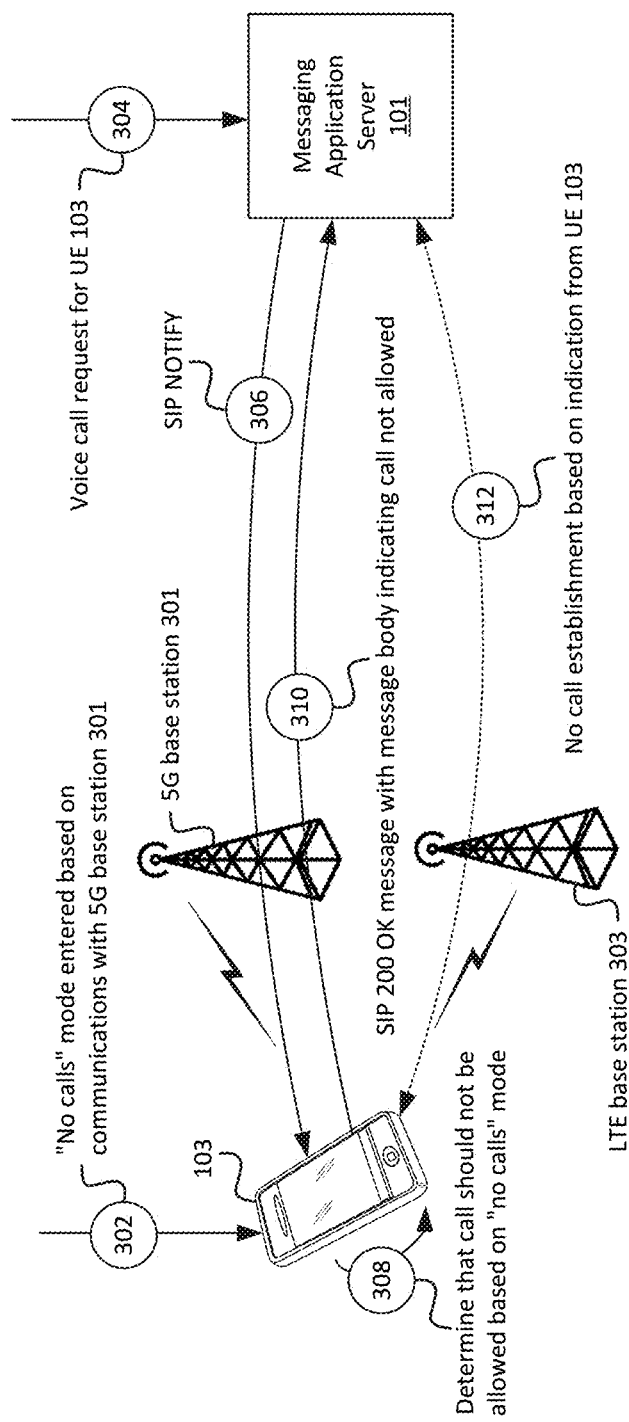
FIG. 3 illustrates an example scenario of a UE using SIP messaging to indicate that an incoming call for the UE should not be connected to the UE based on a "no calls" mode associated with the UE, in accordance with some embodiments.

FIG. 3 illustrates an example scenario of UE 103 indicating that an incoming call for UE 103 should not be allowed to be placed, based on a "no calls" mode associated with UE 103. For example, as shown, UE 103 may enter (at 302) a "no calls" mode. In some embodiments, the "no calls" mode may be entered automatically by UE 103 when, for example, UE 103 is in communication with Fifth Generation ("5G") base station 301.

For example, some wireless networks offer wireless connectivity via multiple radio access technologies ("RATs"), such as a 5G RAT, a Long-Term Evolution ("LTE") RAT, a Third Generation ("3G") RAT, etc. Such arrangements may allow dual-mode or multi-mode UEs to communicate with respective base stations that implement the multiple RATs (e.g., 5G base station 301 implementing a 5G RAT and LTE base station 303 implementing a LTE RAT, in this example). In some embodiments, UE 103 may be "anchored" at LTE base station 303, while communicating with 5G base station 301. For example, LTE base station 303 may maintain context information associated with UE 103, and a "fallback" procedure may be used by UE 103 and/or 5G base station 301, in which UE 103 communicates with LTE base station 303 in lieu of 5G base station 301 in certain situations (e.g., when UE 103 is out of range of 5G base station 301, when a voice call is initiated for UE 103, and/or other situations). The fallback procedure may include UE 103 communicating via LTE base station 303 in lieu of (or in addition to) 5G base station 301. In some embodiments, the fallback procedure may be initiated when a call is placed to UE 103, even if UE 103 has not answered the call (e.g., when UE 103 "rings" to notify a user of an incoming call).

In some embodiments, the fallback procedure may cause UE 103 to disconnect from 5G base station 301 in order to communicate with LTE base station 303. In some scenarios, it may be undesirable for such fallback to occur. For example, UE 103 may be engaged in a game session, augmented reality session, voice call session, and/or other type of service in which interruption or disconnection from 5G base station 301 may be detrimental to the user experience. Thus, UE 103 may automatically enter a "no calls" mode, in which calls for UE 103 may be automatically rejected, in order to prevent a fallback from occurring during a call establishment process. In some embodiments, UE 103 may enter this mode automatically upon the launch of certain applications, and/or when actively sending and/or receiving traffic to and/or from 5G base station 301. In some embodiments, UE 103 may enter this mode based on a user selection. In some embodiments, the "no calls" mode may be, or include, a "do not disturb" mode.

At some point after UE 103 has been placed (at 302) in the "no calls" mode, MAS 101 may receive (at 304) a request to establish a call (e.g., a voice call) with UE 103. Accordingly, MAS 101 may output (at 306) a notification, such as a SIP NOTIFY message, to UE 103 regarding the call request. UE 103 may determine (at 308) that the call should be rejected, based on the "no calls" mode associated with UE 103. Accordingly, UE 103 may output (at 310) an indication (e.g., a SIP 200 OK message) that the call is not allowed to be placed to UE 103.

Based on this indication, MAS 101 may not proceed (at 312) with establishing a call with UE 103. As noted above, this call, if it were placed, may have been placed via LTE base station 303 (indicated by dashed line 312), and may have caused a fallback procedure that includes disconnecting UE 103 from 5G base station 301. Accordingly, the rejection of the call (e.g., based on the notification of the call request) prior to actually placing the call may prevent fallback from occurring, which may have degraded the user experience. For example, rejecting the call via the SIP 200 OK message may prevent MAS 101 from sending further messages (e.g., a SIP INVITE message), which may have caused fallback to occur. Thus, while a user could reject an incoming call, the automatic rejection prior to the call being placed to UE 103 may result in less disruption of the user experience.

FIG. 4 illustrates an example data structure 400 that may be used to indicate how certain SIP messaging, in accordance with some embodiments, may be used by UE 103 to indicate whether a given incoming call should be allowed to be placed to UE 103. As shown, for example, data structure 400 may correlate Event types (e.g., as indicated in SIP NOTIFY messages or other suitable messages) to responses (e.g., as indicated in SIP 200 OK messages), as well as actions to take (e.g., by MAS 101) based on such responses.

In some embodiments, different Event types may be associated with different categories, clusters, attributes, etc. of call requests. Generally, and as elaborated below, such Event types, categories, clusters, etc. may be associated with different levels of confidence or severity that a given call request or caller is associated with spam or other undesirable calls, services associated with a caller and/or called party, and/or other attributes.

As noted above, MAS 101 may determine a particular Event type for a particular call request based on, for example, a telephone number of a calling party, a STIR/SHAKEN analysis, and/or some other suitable analysis. In some embodiments, MAS 101 may generate or receive a score or other attribute information associated with the call request. For example, MAS 101 may generate or receive a score (e.g., on a scale of 0-100, or some other suitable scale), indicating a likelihood or severity of undesirability of the call request (e.g., where a score of 100 is a highest level of likelihood or severity of undesirability).

As another example, MAS 101 may determine or receive information indicating attributes or services associated with the call request or the caller, such as whether the call request includes an automated call (sometimes referred to as a "robocall"), whether the call request is associated with one or more enhanced call features, or other information. In some embodiments, such information may be granular, such that different types of automated calls may be able to be differentiated or indicated. For example, a doctor's office or other service provider may use automated calls to remind patients of upcoming appointments.

In some embodiments, MAS 101 may determine or receive information regarding attributes or services associated with the called party (e.g., UE 103). For example, MAS 101 may determine that a network-implemented "do not disturb" feature is active for UE 103, in which UE 103 has indicated that calls should not be placed to UE 103.

While specific examples of Event types, responses, and actions are discussed herein, in practice, additional, fewer, and/or different Event types, responses, and actions may be used. Further, while data structure 400 is represented as a table, in practice, other types of data structures (e.g., linked lists, arrays, trees, etc.) may be used. Further, while a single data structure 400 is shown in this example, in practice, multiple data structures may be used. For example, one data structure may maintain a mapping of Event types to eligible responses for each Event type, while another data structure may maintain a mapping of actions to perform for each response.

As shown, a "Call" Event type, as stored in data structure 400, may not be associated with responses and/or actions related to selectively allowing or rejecting a call request, in accordance with some embodiments. For example, This Event type may be indicated (e.g., in a SIP NOTIFY message) by MAS 101 when MAS 101 does not perform an analysis of whether the call request is, or may be, spam. When receiving a response to this message (e.g., a SIP 200 OK message), MAS 101 may proceed with call establishment or other operations, independent of a body of the response (e.g., a content of the body of the SIP 200 OK message, and/or whether the SIP 200 OK message included message body content at all).

As further shown, an example "Spam_0" Event type may also not be associated with responses and/or actions, in accordance with some embodiments. For example, This Event type may be determined by MAS 101 when MAS 101 does not determine that a given call request is likely to be spam, if the call request is associated with a spam likelihood or severity score of 0, etc. While MAS 101 may treat responses to this type of Event the same as to the "Call" Event type, the Event type may be used by UE 103. For example, UE 103 may notify (e.g., via a GUI) that the call request has been analyzed for spam and is marked as "safe" or "not spam."

As additionally shown, an example "Spam_70" Event type may be associated with three example responses: "Block," "BlockNotify," and "Allow." For example, such an Event type may be included in a SIP NOTIFY message when MAS 101 determines that a score associated with a call request (e.g., a score indicating likelihood or severity of spam or other undesirability) is at least a threshold score, and/or is between two threshold scores. The "Spam_70" score, in this example, may be associated with scores between 1 and 70, inclusive. In some embodiments, when indicating an Event type of "Spam_70" and receiving (e.g., via a body of a SIP 200 OK message) a "Block" response, MAS 101 may not attempt to further establish the call (e.g., may not send a SIP INVITE, associated with the call request, to UE 103). In some embodiments, when indicating an Event type of "Spam_70" and receiving (e.g., via a body of a SIP 200 OK message) a "BlockNotify" response, MAS 101 may not attempt to further establish the call, and may further provide a notification to the calling party that the call was blocked. On the other hand, when indicating an Event type of "Spam_70" and receiving (e.g., via a body of a SIP 200 OK message) an "Allow" response, MAS 101 may proceed with establishing the requested call (e.g., may send a SIP INVITE and/or one or more other suitable messages to UE 103).

Example Event type "Spam_90" may include similar responses and actions as the example "Spam_70" Event type, with the exception that the "BlockNotify" response is not supported for this Event type. For example, an owner and/or operator associated with MAS 101 may not wish for network resources to be consumed by notifying certain calling parties, such as those for which call requests can be determined with a relatively high degree of certainty as being undesirable (e.g., call requests associated with a score of 90 or higher).

As further shown, example Event type "EnhCall" may be associated with an enhanced calling service provided by MAS 101. For example, a calling party and a called party (e.g., UE 103) may register with MAS 101 as being associated with the enhanced calling service, and/or MAS 101 may provide such services without registration. Generally speaking, such enhanced calling service may include the ability to provide notifications or messages to a calling party when calls from the calling party are rejected.

For example, in addition to "Block" and "Allow," the "EnhCall" Event type may be associated with different responses based on which MAS 101 may take different actions. For example, the response "Block1" (e.g., which may be provided by UE 103 in a SIP 200 OK message in response to a SIP NOTIFY message with an Event type of "EnhCall" sent by MAS 101) may indicate that a requested call should not be placed to UE 103, and that the caller should be notified with a first preset message. On the other hand, the response "Block2" may indicate that a requested call should not be placed to UE 103, and that the caller should be notified with a different second preset message.

Further, the response "BlockCustom" may indicate that a requested call should be placed, and that the caller should be notified with a custom message. In some embodiments, the custom message may also be included in the response (e.g., SIP 200 OK) message from UE 103. Some examples regarding the selection of such notification options in response to a "EnhCall" type are provided below with respect to FIGS. 5-7.

As additionally shown in FIG. 4, an example "NwDND" Event type may be associated with a network-implemented "do not disturb" feature, in which UE 103 may indicate to MAS 101 or some other network device that calls should not be allowed to be placed to UE 103, which may include forgoing providing a SIP INVITE to UE 103, causing UE 103 to ring, etc. In some embodiments, some exceptions to this "do not disturb" functionality may be provided. For example, when UE 103 is in the network-implemented "do not disturb" mode, MAS 101 may notify UE 103 of call requests using the "NwDND" Event type (e.g., in lieu of a "Call" Event type). When receiving the "BlockDND" response from UE 103 (e.g., via a SIP 200 OK message), MAS 101 may notify the caller that UE 103 has a "do not disturb" feature active. In some embodiments, as discussed below, even though UE 103 is in a "do not disturb" mode, UE 103 may still respond with an "Allow" response, such as when UE 103 automatically determines that the call should be allowed (e.g., if the caller is in a whitelist associated with UE 103), and/or when a user associated with UE 103 indicates that the call should be allowed. An example of how such a call may be handled is provided below with respect to FIG. 8.

As further shown in FIG. 4, an "InfoRobocall" Event type may be indicated by MAS 101 when MAS 101 identifies that a given call request is associated with an automated call or robocall, but may still have information that may be desirable to a user. For example, MAS 101 may determine that the caller is associated with a doctor's office, institution, or other entity associated with informational robocalls. MAS 101 may also maintain information regarding contact information, associated with UE 103, other than a telephone number associated with UE 103. For example, MAS 101 may receive and store information associated with a user account, email address, messaging handle, and/or other contact information associated with UE 103.

When determining that a given call should be associated with the "InfoRobocall" Event type, MAS 101 may receive a "BlockTranscribe" response from UE 103. The "BlockTranscribe" response may cause UE 101 to answer the call, transcribe audio received via the call to text, and provide the text to UE 103 and/or to other contact information associated with UE 103 (e.g., an email address, etc.). In some embodiments, the caller may be associated with a service whereby MAS 101 is explicitly authorized by the caller to answer calls on behalf of UE 103, and provide transcripts of calls to UE 103. In some embodiments, MAS 101 may act as a proxy on behalf of UE 103, and may answer and transcribe the call without needing interactions or authorization from the calling party.

Figure 5:
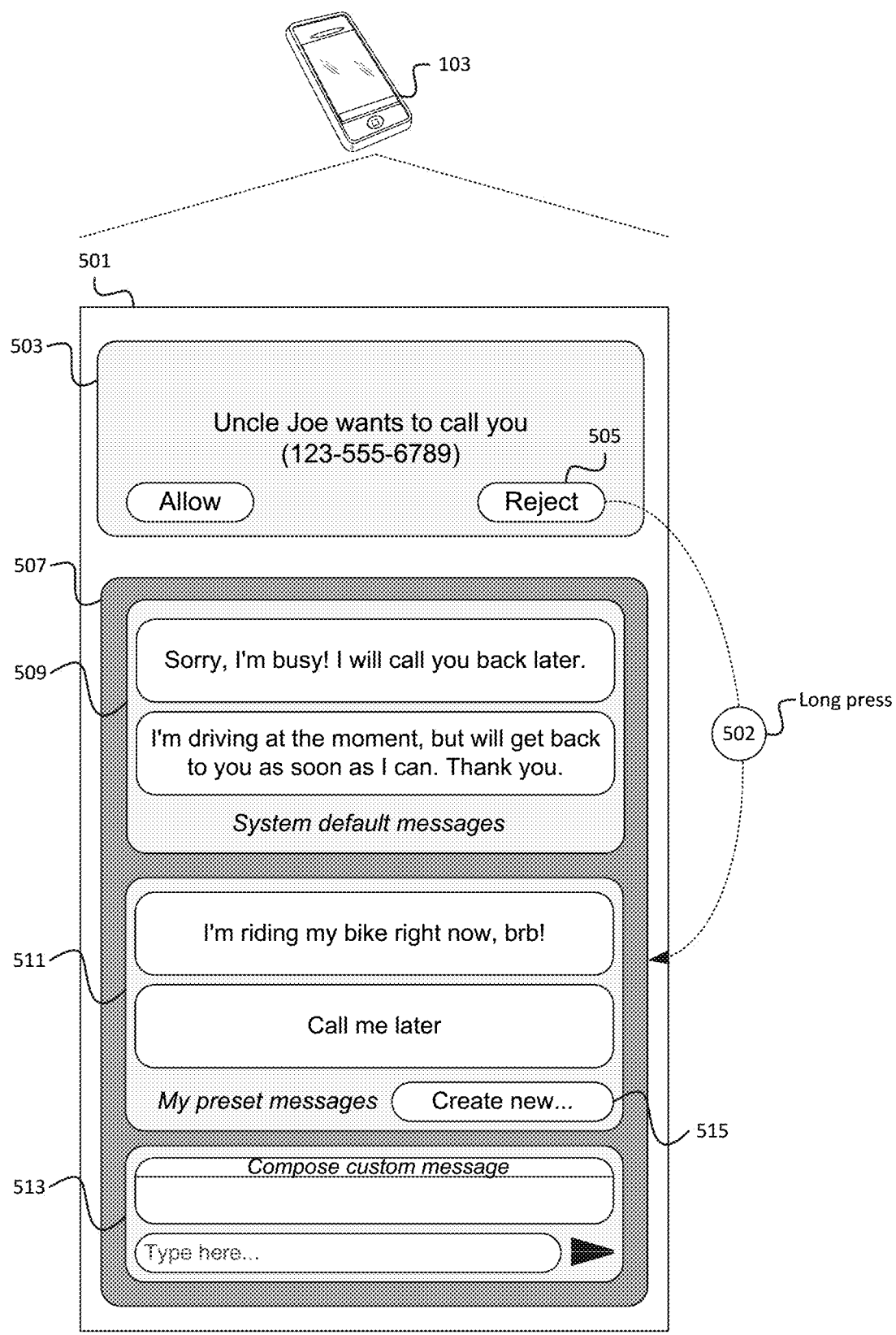
FIG. 5 illustrates an example user interface that may be presented by a UE and used to select a message to provide to a caller when an incoming call for the UE is to be rejected, in accordance with some embodiments.

FIG. 5 illustrates an example user interface (e.g., GUI 501) that may be presented by UE 103 to indicate an incoming call request, and provide options to provide to a caller when a user of UE 103 wishes to reject the call, in accordance with some embodiments. For example, as shown, GUI 501 may include notification 503, which UE 103 may present based on receiving a SIP NOTIFY message with a given Event type (e.g., "EnhCall," referring to the examples provided in FIG. 4). The NOTIFY message may include a telephone number or other identifier of the caller (e.g., "123-555-6789" in this example), which may be included in notification 503. In some embodiments, UE 103 may provide supplemental information based on information stored by UE 103, such as an address book. In this example, the address book of UE 103 may indicate that the telephone number "123-555-6789" is associated with the name "Uncle Joe," and thus notification 503 may also include the stored name of the caller. In some embodiments, notification 503 may be a "pre-notification" of an incoming call, and may be presented prior to UE 103 receiving a SIP INVITE message or other type of message associated with performing a call setup procedure.

In some embodiments, the "pre-notification" may vary based on the Event type of the received notification (e.g., SIP NOTIFY) message. For example, for the "EnhCall" Event type, the "pre-notification" may include an indication, such as text, an icon, an image, or the like, indicating that the caller (e.g., "Uncle Joe" in this example) is associated with an enhanced calling service, in which a rejection message may be sent to the caller when rejecting the message. In another example, when the received notification message indicates particular spam Event type (e.g., "Spam_70," "Spam_90," etc.), the "pre-notification" may include an indication that the call is, or may be, a spam call or other undesirable call. For example, in the event that the caller is in the address book of UE 103 (e.g., "Uncle Joe"), UE 103 may provide a "pre-notification" such as "A caller who may be a spammer or Uncle Joe wants to call you (123-555-6789)."

Returning to the example of FIG. 5, notification 503 may include selectable options (e.g., buttons), such as an option to allow the call, and option 505 to reject the call. In some embodiments, option 505 may have functionality to select a particular rejection message, and/or to reject the call request without providing a rejection message. For example, a first type of interaction (e.g., a simple press) of option 505 may cause the call request to be rejected without providing a notification message to the caller. Such response may correspond to, for example, a "Block" response, as discussed above with respect to FIG. 4.

In some embodiments, a second type of interaction (e.g., a "long press" 502) may cause additional options 507 to be presented. Options 507 may include options to provide a message to the caller, in addition to rejecting the call request. For example, a first set of options 509 may correspond to system default messages. For example, one of the options 509 (e.g., "Sorry, I'm busy! I will call you back later.") may correspond to the "Block1" response shown in FIG. 4, while another one of the options 509 (e.g., "I'm driving at the moment, but will get back to you as soon as I can. Thank you.") may correspond to the "Block2" response shown in FIG. 4. These options may correspond to "system default" messages, in that the messages associated with these options may be associated with particular response types (e.g., "Block1" or "Block2") provided by UE 103 to MAS 101.

Options 507 may further include options 511, which may correspond to UE-preset messages. For example, a user associated with UE 103 may have previously specified certain custom messages, such as by using option 515 to create preset messages for later use. When a particular option 511 is selected, UE 103 may output a SIP 200 OK message, with a BlockCustom response in the body of the SIP 200 OK message. Further, UE 103 may include the text of the selected option to MAS 101 in the body of the SIP 200 OK message.

Option 513 may include an option to type (e.g., using text input, voice to text, or some other suitable mechanism) and send a custom message to the caller. Similar to options 511, selection of option 513 may cause UE 103 to output a SIP 200 OK message, with a BlockCustom response in the body of the SIP 200 OK message, and further including the message received via option 513.

Figure 6:
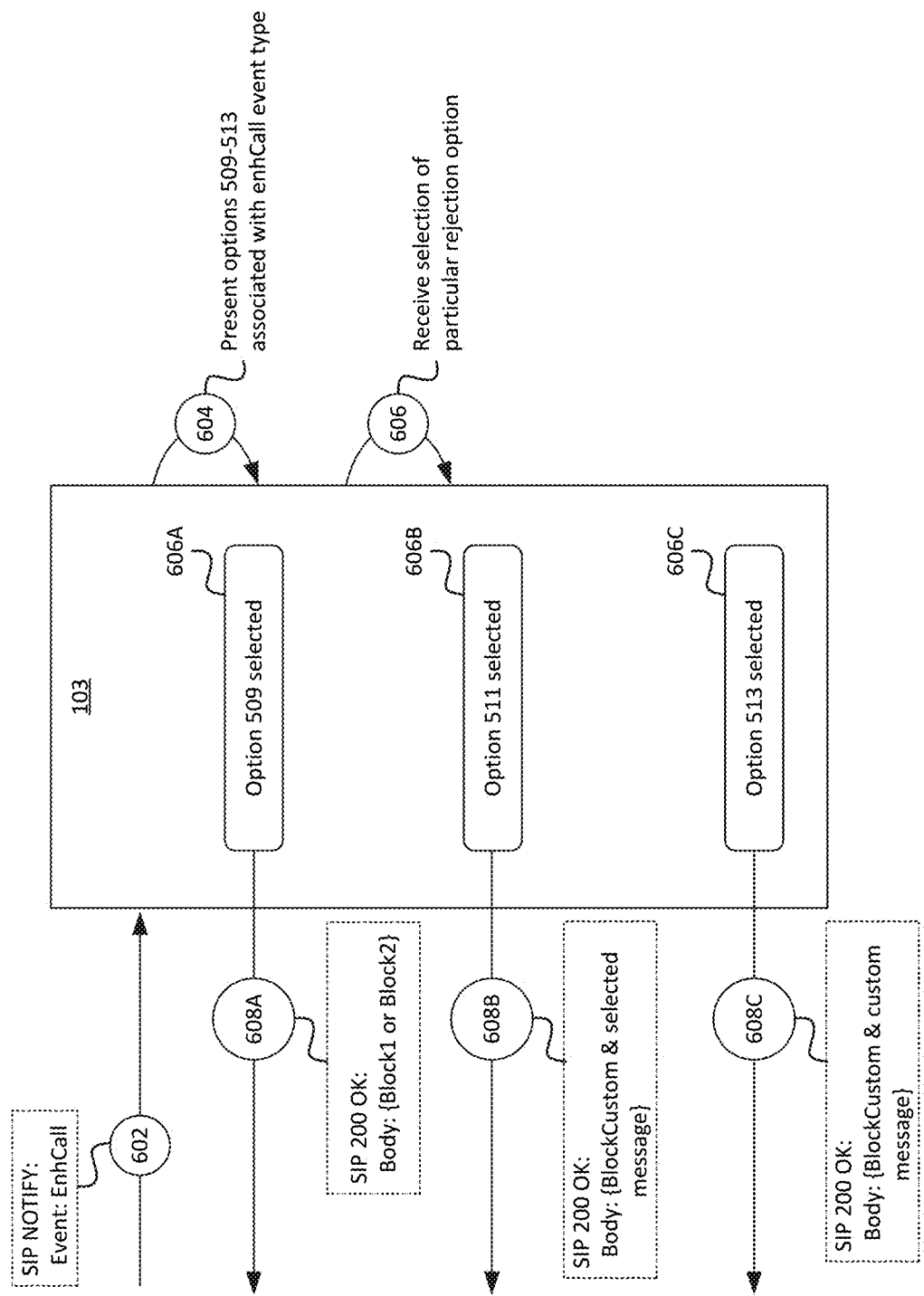
FIGS. 6 and 7 illustrate example signal flows associated with providing a message to a caller when an incoming call for a UE is rejected, in accordance with some embodiments.
Figure 7:
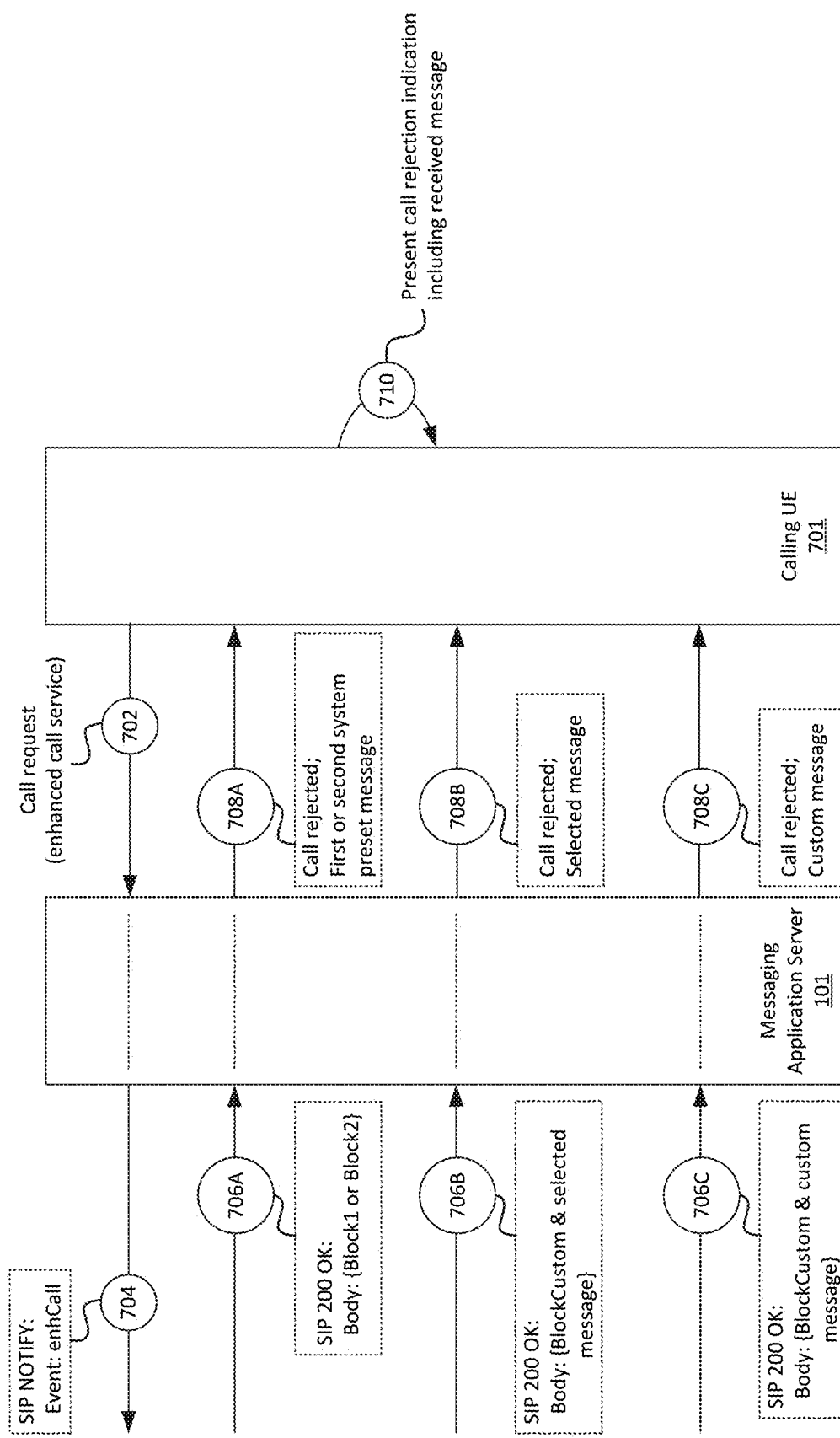

FIGS. 6 and 7 illustrate example signal flows corresponding to the example options discussed above with respect to FIG. 5. For example, as shown in FIG. 6, UE 103 may receive (at 602) a SIP NOTIFY message from MAS 101, with an Event type of "EnhCall." Based on receiving the SIP NOTIFY message with this Event type, UE 103 may present (at 604) options 509-513 (and/or some other options based on the Event type), based on which a particular option may be selected (at 606).

For example, when a particular option 509 is selected (at 606A), then UE 103 may output (at 608A) a SIP 200 OK message with a particular response that corresponds to the selected option 509 (e.g., "Block1" or "Block2," in this example). On the other hand, if a particular option 511 is selected (at 606B), UE 103 may output (at 608B) a SIP 200 OK message that includes a "BlockCustom" response in a body of the message, along with text associated with the selected message. If option 513 is selected (at 606C), then UE 103 may output (at 608C) a SIP 200 OK message that include a "BlockCustom" response in a body of the message, along with text input via option 513.

As shown in FIG. 7, MAS 101 may receive (at 702) a call request from calling UE 701. The call request may, in some embodiments, include an indication that UE 701 is associated with an enhanced calling service (e.g., in which responses may be provided to UE 701 when call requests for UE 701 are rejected), and/or MAS 101 may otherwise determine that UE 701 is capable of receiving messages indicating that call requests from UE 701 have been rejected.

Based on receiving (at 702) the call request, MAS 101 may output (at 704) a SIP NOTIFY message to UE 103, including an Event type of "EnhCall." MAS 101 may receive a SIP 200 OK message from UE 103 based on the SIP NOTIFY message, and further based on one or more options selected at UE 103 (e.g., as similarly discussed above). For example, when receiving (at 706A) a SIP 200 OK message with a body indicating response of "Block1" or "Block2," MAS 101 may output (at 708A) an indication to UE 701 that the call was rejected, and may include a corresponding system preset message associated with the selected response. On the other hand, when receiving (at 706B or 706C) a SIP 200 OK message with a body indicating a response of "BlockCustom" and a message (e.g., a UE-preset message or a user-provided message), MAS 101 may output (at 708B or 708C) an indication to UE 701 that the call was rejected, as well as the message provided by UE 103. In some embodiments, UE 701 may present (at 710) an indication (e.g., via a GUI) that the call was rejected, and may further present the message received (at 708A-708C) from UE 103 via MAS 101.

Figure 8:
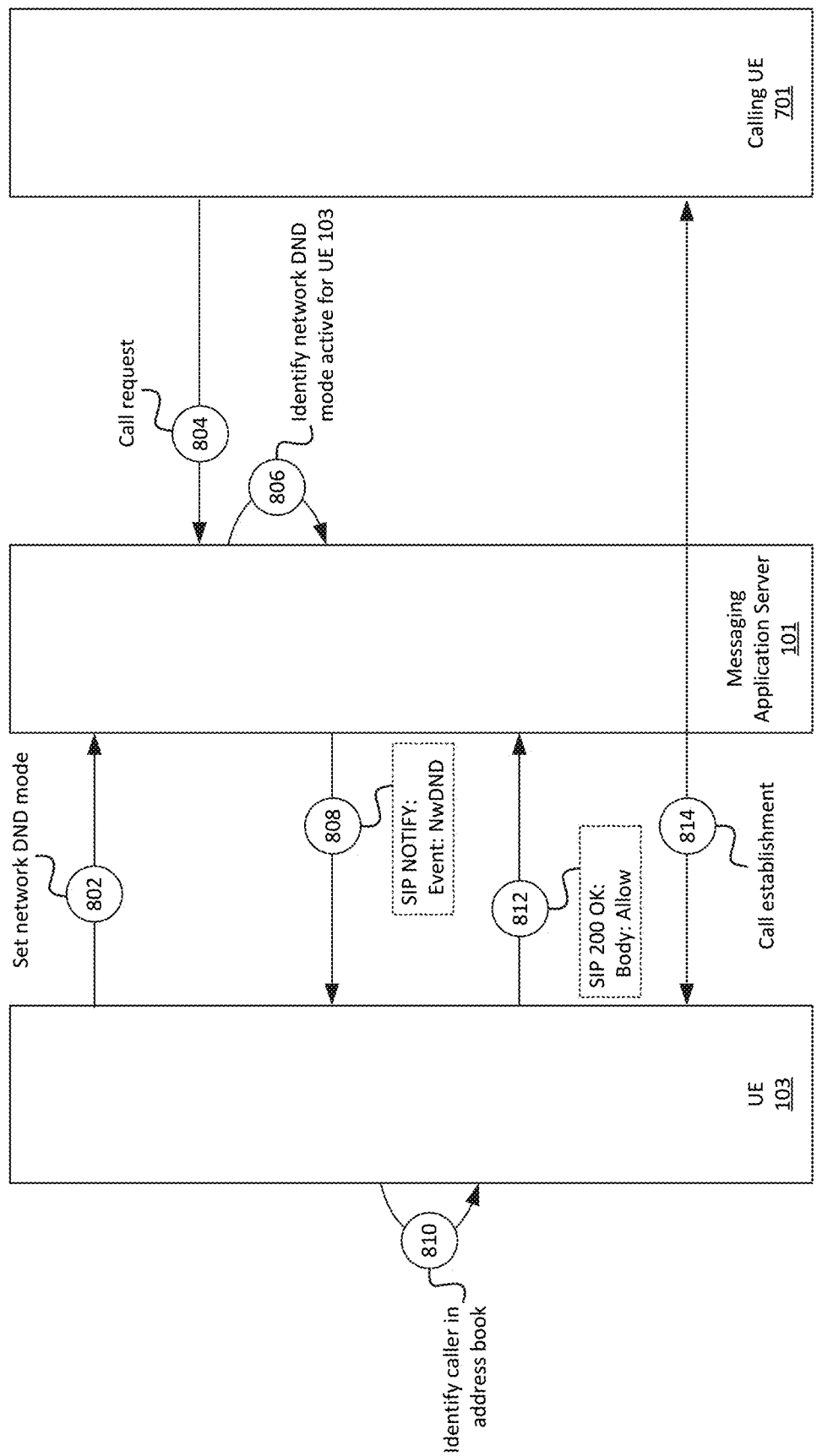
FIG. 8 illustrates an example signal flow associated with a UE using SIP messaging to automatically override a network-side "do not disturb" mode associated with the UE, in accordance with some embodiments.

FIG. 8 illustrates an example signal flow associated with UE 103 using SIP messaging to automatically override a network-implemented "do not disturb" mode associated with the UE, in accordance with some embodiments. For example, as shown, UE 103 may indicate (at 802) to MAS 101 that a network-implemented "do not disturb" mode should be enabled with respect to UE 103. After this mode has been enabled, MAS 101 may receive (at 804) a call request from calling UE 701. Based on receiving this call request, MAS 101 may further identify (at 806) that the network-implemented "do not disturb" mode is active for UE 103. Based on identifying that the network-implemented "do not disturb" mode is active for UE 103, MAS 101 may output (at 808) a SIP NOTIFY message with an Event type of "NwDND" (e.g., referring to the example Event types shown in FIG. 4).

Based on receiving the SIP NOTIFY message, UE 103 may determine whether the network-implemented "do not disturb" mode should be overridden (e.g., whether to allow the requested call to be placed, notwithstanding the "do not disturb" mode). For example, UE 103 may determine whether calling UE 701 (e.g., a telephone number or other identifier associated with UE 701, which may be included in the SIP NOTIFY message) is in an address book associated with UE 103 and/or is in a whitelist associated with UE 103. For example, the whitelist may be a set of telephone numbers or other identifiers for which calls may be placed to UE 103, notwithstanding the network-implemented "do not disturb" mode. In some embodiments, the whitelist may be user-specified (e.g., by a user associated with UE 103), and/or may be retrieved from an external device or system.

In this example, UE 103 may identify (at 810) that a telephone number associated with UE 701 is in an address book associated with UE 103, and that the call should therefore be allowed to be placed. In some embodiments, UE 103 may make this determination without presenting a notification or prompt based on receiving (at 808) the SIP NOTIFY message. In other words, this determination may be made without input or interaction from a user (e.g., other than an interaction by which UE 701 is included in the whitelist, address book, etc. associated with UE 103).

Based on determining (at 810) that the telephone number associated with UE 701 is in the address book of UE 103, UE 103 may output (at 812) a SIP 200 OK message with a body that includes an "Allow" response, based on which UE 103, MAS 101, and calling UE 701 may perform (at 814) a call establishment procedure to initiate establish the call between UE 103 and UE 701. Such call establishment may include one or more SIP messages, including a SIP INVITE message, based on which UE 103 may "ring" or otherwise indicate that a call has been placed to UE 103.

Figure 9:
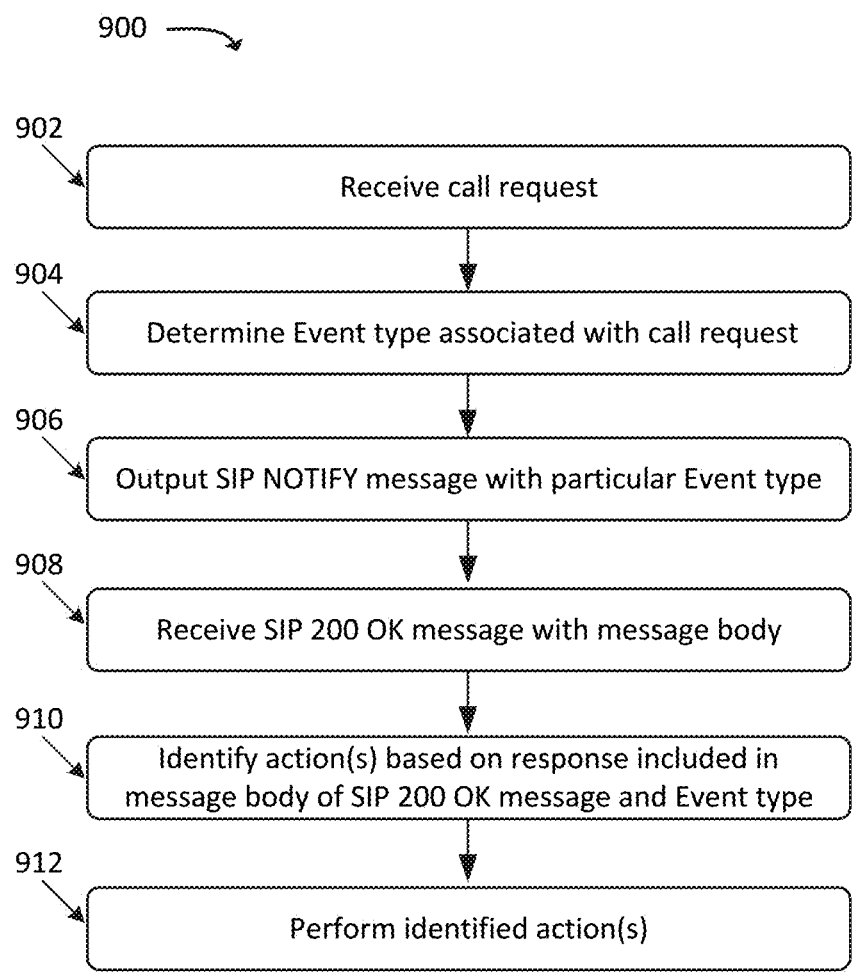
FIG. 9 illustrates an example process for handling a call request based on messages received from a called UE, in accordance with some embodiments.

FIG. 9 illustrates an example process 900 for performing one or more actions based on messaging provided by UE 103 in response to a call request provided to UE 103. In some embodiments, some or all of process 900 may be performed by MAS 101. In some embodiments, one or more other devices may perform some or all of process 900 in concert with, and/or in lieu of, MAS 101.

As shown, process 900 may include receiving (at 902) a call request. For example, MAS 101 may receive a call request, from calling UE 701, for UE 103. The call request may be in the form of an application-level request, a SIP message, and/or some other suitable type of request. The call request may include an identifier of calling UE 701 and/or of UE 103, such as one or more telephone numbers, Mobile Directory Numbers ("MDNs"), SIP identifiers, and/or other identifiers to uniquely identify calling UE 701 and/or UE 103.

Process 900 may further include determining (at 904) an Event type associated with the call request. For example, as discussed above, MAS 101 may perform an analysis of one or more attributes of calling UE 701 and/or UE 103. Based on these attributes, MAS 101 may determine whether the call request is a spam call, determine or receive one or more scores indicating a likelihood or severity of undesirability of the call request, determine or receive one or more scores indicating a likelihood or severity of undesirability of calls from calling UE 701, or the like. Additionally, or alternatively, MAS 101 may identify whether calling UE 701 and/or UE 103 are associated with one or more services, such as an enhanced calling and/or messaging service. Additionally, or alternatively, MAS 101 may identify whether UE 103 is associated with a "do not disturb" service. MAS 101 may determine the Event type, associated with the call request (received at 902), based on one or more the above-listed factors, and/or one or more other suitable factors.

Process 900 may additionally include outputting (at 906) a notification message (e.g., a SIP NOTIFY) message, indicating the identified Event type. In some embodiments, MAS 101 may output (at 906) this notification to UE 103, prior to performing a call setup procedure (e.g., prior to sending a SIP INVITE message, prior to initiating a procedure that causes UE 103 to "ring," prior to initiating a procedure that would cause UE 103 to be disconnected from a currently active RAT (e.g., a fallback procedure), and/or prior to one or more other call setup procedures).

In some embodiments, as discussed above, UE 103 may present a notification (e.g., a visual notification, audible notification, haptic notification, or other type of notification) based on receiving the notification message. UE 103 may, in some embodiments, present one or more options for how to handle the call request, which may include rejecting the call request (e.g., not allowing a call setup procedure to occur pursuant to the call request), or allowing the call request. As discussed above, the rejection options may further include one or more messaging options, to provide a message to calling UE 701. UE 103 may present different options, GUIs, etc. for different Event types. For example, one Event type may be associated with multiple options for messages to provide to calling UE 701, while another event type may be associated with no options for messages to provide to calling UE 701, while still another event type may be associated with a different set of options for messages to provide to calling UE 701.

In some embodiments, UE 103 may forgo presenting a user-facing notification (e.g., an audible, visual, or haptic notification), and may determine how to handle the call request without requiring specific user interaction in response to the call request. For example, as discussed above, UE 103 may determine whether an MDN of calling UE 701 is in an address book or whitelist, may perform a query to a data store that may include information suitable for determining whether calling UE 701 is an undesirable caller, whether UE 103 is involved in an active communication session (e.g., a gaming session, a video streaming session, etc.), whether UE 103 is connected to a RAN via a particular RAT, and/or other factors associated with UE 103. Based on these factors, and/or one or more other factors, UE 103 may determine how to handle the received call request, without user interaction and/or notifying a user of UE 103.

Process 900 may also include receiving (at 908) a response (e.g., a SIP 200 OK message) to the call request, which may include a message body. As discussed above, the message body may include a particular response associated with the Event type, where different Event types are associated with different responses and associated actions.

Process 900 may further include identifying (at 910) one or more actions to perform based on the response included in the message body of the response (e.g., the SIP 200 OK message) and the Event type. For example, as discussed below, the actions may include facilitating or performing a call setup procedure between calling UE 701 and UE 103, rejecting the call request prior to facilitating or performing a call setup procedure between calling UE 701 and UE 103, sending a message to calling UE 701, and/or one or more other actions. MAS 101 may accordingly perform (at 912) the identified one or more actions.

Figure 10:
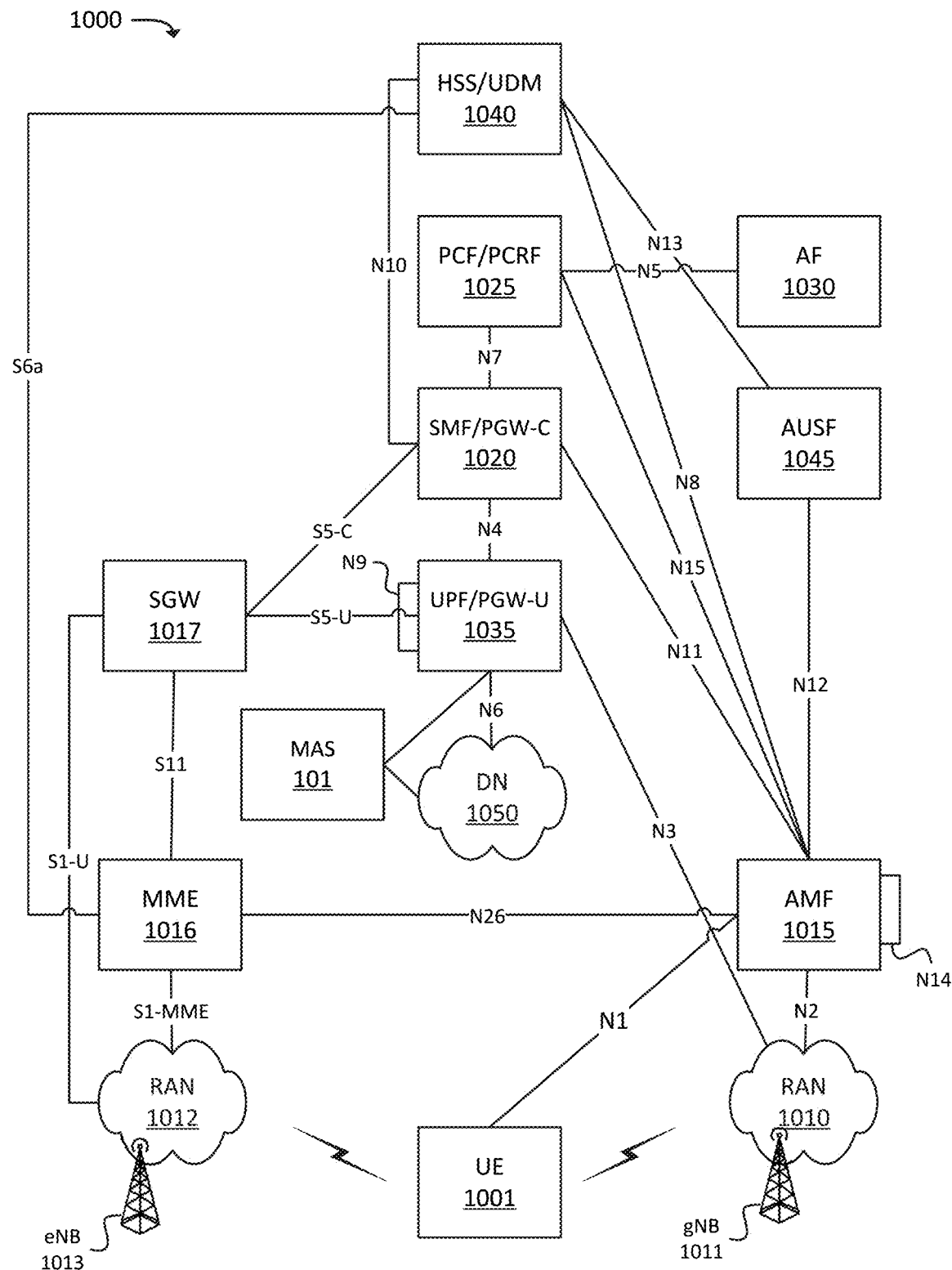
FIG. 10 illustrates an example environment in which one or more embodiments, described herein, may be implemented.

FIG. 10 illustrates an example environment 1000, in which one or more embodiments may be implemented. In some embodiments, environment 1000 may correspond to a 5G network, and/or may include elements of a 5G network. In some embodiments, environment 1000 may correspond to a 5G Non-Standalone ("NSA") architecture, in which a 5G RAT may be used in conjunction with one or more other RATs (e.g., a LTE RAT), and/or in which elements of a 5G core network may be implemented by, may be communicatively coupled with, and/or may include elements of another type of core network (e.g., an evolved packet core ("EPC")). As shown, environment 1000 may include UE 1001, RAN 1010 (which may include one or more Next Generation Node Bs ("gNBs") 1011), RAN 1012 (which may include one or more one or more evolved Node Bs ("eNBs") 1013), and various network functions such as Access and Mobility Management Function ("AMF") 1015, Mobility Management Entity ("MME") 1016, Serving Gateway ("SGW") 1017, Session Management Function ("SMF")/Packet Data Network ("PDN") Gateway ("PGW")-Control plane function ("PGW-C") 1020, Policy Control Function ("PCF")/Policy Charging and Rules Function ("PCRF") 1025, Application Function ("AF") 1030, User Plane Function ("UPF")/PGW-User plane function ("PGW-U") 1035, Home Subscriber Server ("HSS")/Unified Data Management ("UDM") 1040, Authentication Server Function ("AUSF") 1045, and MAS 101. Environment 1000 may also include one or more networks, such as Data Network ("DN") 1050.

The quantity of devices and/or networks, illustrated in FIG. 10, is provided for explanatory purposes only. In practice, environment 1000 may include additional devices and/or networks, fewer devices and/or networks, different devices and/or networks, or differently arranged devices and/or networks than illustrated in FIG. 10. For example, while not shown, environment 1000 may include devices that facilitate or enable communication between various components shown in environment 1000, such as routers, modems, gateways, switches, hubs, etc. Alternatively, or additionally, one or more of the devices of environment 1000 may perform one or more network functions described as being performed by another one or more of the devices of environment 1000. Devices of environment 1000 may interconnect with each other and/or other devices via wired connections, wireless connections, or a combination of wired and wireless connections. In some implementations, one or more devices of environment 1000 may be physically integrated in, and/or may be physically attached to, one or more other devices of environment 1000.

UE 1001 may include a computation and communication device, such as a wireless mobile communication device that is capable of communicating with RAN 1010 and/or DN 1050. UE 1001 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, a Mobile-to-Mobile ("M2M") device, an Internet of Things ("IoT") device, a Mobile-to-Mobile ("M2M") device, or another type of mobile computation and communication device. UE 1001 may send traffic to and/or receive traffic (e.g., user plane traffic) from DN 1050 via RAN 1010 and UPF/PGW-U 1035. UEs 103 and 701, discussed above, may be instances of UE 1001.

RAN 1010 may be, or may include, a 5G RAN that includes one or more base stations (e.g., one or more gNBs 1011), via which UE 1001 may communicate with one or more other elements of environment 1000. In some embodiments, 5G base station 301 may be an instance of gNB 1011. UE 1001 may communicate with RAN 1010 via an air interface (e.g., as provided by gNB 1011). For instance, RAN 1010 may receive traffic (e.g., voice call traffic, data traffic, messaging traffic, signaling traffic, etc.) from UE 1001 via the air interface, and may communicate the traffic to UPF/PGW-U 1035, and/or one or more other devices or networks. Similarly, RAN 1010 may receive traffic intended for UE 1001 (e.g., from UPF/PGW-U 1035, AMF 1015, and/or one or more other devices or networks) and may communicate the traffic to UE 1001 via the air interface.

RAN 1012 may be, or may include, an LTE RAN that includes one or more base stations (e.g., one or more eNBs 1013), via which UE 1001 may communicate with one or more other elements of environment 1000. In some embodiments, LTE base station 303 may be an instance of eNB 1013. UE 1001 may communicate with RAN 1012 via an air interface (e.g., as provided by eNB 1013). For instance, RAN 1010 may receive traffic (e.g., voice call traffic, data traffic, messaging traffic, signaling traffic, etc.) from UE 1001 via the air interface, and may communicate the traffic to UPF/PGW-U 1035, and/or one or more other devices or networks. Similarly, RAN 1010 may receive traffic intended for UE 1001 (e.g., from UPF/PGW-U 1035, SGW 1017, and/or one or more other devices or networks) and may communicate the traffic to UE 1001 via the air interface.

AMF 1015 may include one or more devices, systems, Virtualized Network Functions ("VNFs"), etc., that perform operations to register UE 1001 with the 5G network, to establish bearer channels associated with a session with UE 1001, to hand off UE 1001 from the 5G network to another network, to hand off UE 1001 from the other network to the 5G network, manage mobility of UE 1001 between RANs 1010 and/or gNBs 1011, and/or to perform other operations. In some embodiments, the 5G network may include multiple AMFs 1015, which communicate with each other via the N14 interface (denoted in FIG. 10 by the line marked "N14" originating and terminating at AMF 1015).

MME 1016 may include one or more devices, systems, VNFs, etc., that perform operations to register UE 1001 with the EPC, to establish bearer channels associated with a session with UE 1001, to hand off UE 1001 from the EPC to another network, to hand off UE 1001 from another network to the EPC, manage mobility of UE 1001 between RANs 1012 and/or eNBs 1013, and/or to perform other operations.

SGW 1017 may include one or more devices, systems, VNFs, etc., that aggregate traffic received from one or more eNBs 1013 and send the aggregated traffic to an external network or device via UPF/PGW-U 1035. Additionally, SGW 1017 may aggregate traffic received from one or more UPF/PGW-Us 1035 and may send the aggregated traffic to one or more eNBs 1013. SGW 1017 may operate as an anchor for the user plane during inter-eNB handovers and as an anchor for mobility between different telecommunication networks or RANs (e.g., RANs 1010 and 1012).

SMF/PGW-C 1020 may include one or more devices, systems, VNFs, etc., that gather, process, store, and/or provide information in a manner described herein. SMF/PGW-C 1020 may, for example, facilitate in the establishment of communication sessions on behalf of UE 1001. In some embodiments, the establishment of communications sessions may be performed in accordance with one or more policies provided by PCF/PCRF 1025.

PCF/PCRF 1025 may include one or more devices, systems, VNFs, etc., that aggregate information to and from the 5G network and/or other sources. PCF/PCRF 1025 may receive information regarding policies and/or subscriptions from one or more sources, such as subscriber databases and/or from one or more users (such as, for example, an administrator associated with PCF/PCRF 1025).

AF 1030 may include one or more devices, systems, VNFs, etc., that receive, store, and/or provide information that may be used in determining parameters (e.g., quality of service parameters, charging parameters, or the like) for certain applications.

UPF/PGW-U 1035 may include one or more devices, systems, VNFs, etc., that receive, store, and/or provide data (e.g., user plane data). For example, UPF/PGW-U 1035 may receive user plane data (e.g., voice call traffic, data traffic, etc.), destined for UE 1001, from DN 1050, and may forward the user plane data toward UE 1001 (e.g., via RAN 1010, SMF/PGW-C 1020, and/or one or more other devices). In some embodiments, multiple UPFs 1035 may be deployed (e.g., in different geographical locations), and the delivery of content to UE 1001 may be coordinated via the N9 interface (e.g., as denoted in FIG. 10 by the line marked "N9" originating and terminating at UPF/PGW-U 1035). Similarly, UPF/PGW-U 1035 may receive traffic from UE 1001 (e.g., via RAN 1010, SMF/PGW-C 1020, and/or one or more other devices), and may forward the traffic toward DN 1050. In some embodiments, UPF/PGW-U 1035 may communicate (e.g., via the N4 interface) with SMF/PGW-C 1020, regarding user plane data processed by UPF/PGW-U 1035.

HSS/UDM 1040 and AUSF 1045 may include one or more devices, systems, VNFs, etc., that manage, update, and/or store, in one or more memory devices associated with AUSF 1045 and/or HSS/UDM 1040, profile information associated with a subscriber. AUSF 1045 and/or HSS/UDM 1040 may perform authentication, authorization, and/or accounting operations associated with the subscriber and/or a communication session with UE 1001.

DN 1050 may include one or more wired and/or wireless networks. For example, DN 1050 may include an Internet Protocol ("IP")-based PDN, a wide area network ("WAN") such as the Internet, a private enterprise network, and/or one or more other networks. UE 1001 may communicate, through DN 1050, with data servers, other UEs 1001, and/or to other servers or applications that are coupled to DN 1050. DN 1050 may be connected to one or more other networks, such as a public switched telephone network ("PSTN"), a public land mobile network ("PLMN"), and/or another network. DN 1050 may be connected to one or more devices, such as content providers, applications, web servers, and/or other devices, with which UE 1001 may communicate.

MAS 101 may include one or more devices, systems, VNFs, etc. that perform one or more operations discussed above. For example, MAS 101 may determine Event types associated with call requests, output notification messages (e.g., SIP messages, such as SIP NOTIFY messages) that include the Event types, and handle the call requests (e.g., perform or forgo performing subsequent call setup procedures) based on responses (e.g., SIP 200 OK messages) to the notification messages. MAS 101 may receive and output such messages via DN 1050, UPF/PGW-U 1035, and/or one or more other devices or systems. For example, while not shown here, MAS 101 may be communicatively coupled to an IP Multimedia Subsystem ("IMS") network that provides messaging and/or call setup services.

Figure 11:
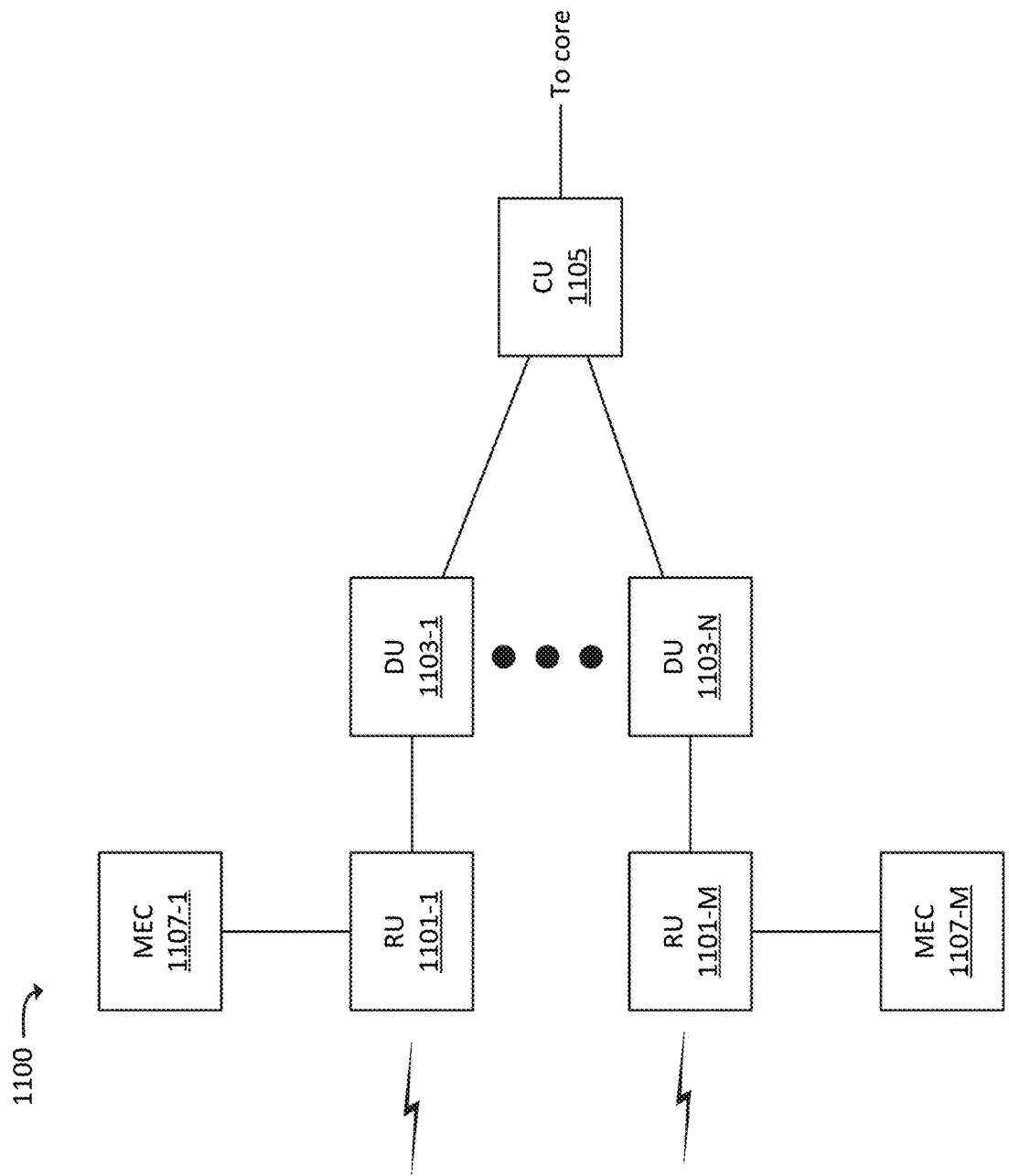
FIG. 11 illustrates an example arrangement of one or more elements of a radio access network ("RAN"), in accordance with some embodiments.

FIG. 11 illustrates an example Distributed Unit ("DU") network 1100, which may be included in and/or implemented by one or more RANs (e.g., RAN 1010). In some embodiments, a particular RAN may include one DU network 1100. In some embodiments, a particular RAN may include multiple DU networks 1100. In some embodiments, DU network 1100 may correspond to a particular gNB 1011 of a 5G RAN (e.g., RAN 1010). In some embodiments, DU network 1100 may correspond to multiple gNBs 1011. In some embodiments, DU network 1100 may correspond to one or more other types of base stations of one or more other types of RANs. As shown, DU network 1100 may include Control Unit ("CU") 1105, one or more Distributed Units ("DUs") 1103-1 through 1103-N (referred to individually as "DU 1103," or collectively as "DUs 1103"), and one or more Remote Units ("RUs") 1101-1 through 1101-M (referred to individually as "RU 1101," or collectively as "RUs 1101").

CU 1105 may communicate with a core of a wireless network (e.g., may communicate with one or more of the devices or systems described above with respect to FIG. 10, such as AMF 1015 and/or UPF/PGW-U 1035). In the uplink direction (e.g., for traffic from UEs 1001 to a core network), CU 1105 may aggregate traffic from DUs 1103, and forward the aggregated traffic to the core network. In some embodiments, CU 1105 may receive traffic according to a given protocol (e.g., Radio Link Control ("RLC")) from DUs 1103, and may perform higher-layer processing (e.g., may aggregate/process RLC packets and generate Packet Data Convergence Protocol ("PDCP") packets based on the RLC packets) on the traffic received from DUs 1103.

In accordance with some embodiments, CU 1105 may receive downlink traffic (e.g., traffic from the core network) for a particular UE 1001, and may determine which DU(s) 1103 should receive the downlink traffic. DU 1103 may include one or more devices that transmit traffic between a core network (e.g., via CU 1105) and UE 1001 (e.g., via a respective RU 1101). DU 1103 may, for example, receive traffic from RU 1101 at a first layer (e.g., physical ("PHY") layer traffic, or lower PHY layer traffic), and may process/aggregate the traffic to a second layer (e.g., upper PHY and/or RLC). DU 1103 may receive traffic from CU 1105 at the second layer, may process the traffic to the first layer, and provide the processed traffic to a respective RU 1101 for transmission to UE 1001.

RU 1101 may include hardware circuitry (e.g., one or more RF transceivers, antennas, radios, and/or other suitable hardware) to communicate wirelessly (e.g., via an RF interface) with one or more UEs 1001, one or more other DUs 1103 (e.g., via RUs 1101 associated with DUs 1103), and/or any other suitable type of device. In the uplink direction, RU 1101 may receive traffic from UE 1001 and/or another DU 1103 via the RF interface and may provide the traffic to DU 1103. In the downlink direction, RU 1101 may receive traffic from DU 1103, and may provide the traffic to UE 1001 and/or another DU 1103.

RUs 1101 may, in some embodiments, be communicatively coupled to one or more MECs 1107. For example, RU 1101-1 may be communicatively coupled to MEC 1107-1, RU 1101-M may be communicatively coupled to MEC 1107-M, and so on. MECs 1107 may include hardware resources (e.g., configurable or provisionable hardware resources) that may be configured to provide services and/or otherwise process traffic to and/or from UE 1001, via a respective RU 1101. For example, RU 1101 may route some traffic, from UE 1001, to MEC 1107 instead of to a core network (e.g., via DU 1103 and CU 1105). MEC 1107 may process the traffic, perform one or more computations based on the received traffic, and may provide traffic to UE 1001 via an associated RU 1101. In this manner, ultra-low latency services may be provided to UE 1001, as traffic does not need to traverse DU 1103, CU 1105, and an intervening backhaul network between DU network 1100 and the core network. In some embodiments, 1107 may implement some or all of the functionality discussed above with respect to MAS 101, and/or may be communicatively coupled to MAS 101 to facilitate one or more the operations described above with respect to MAS 101.

Figure 12:
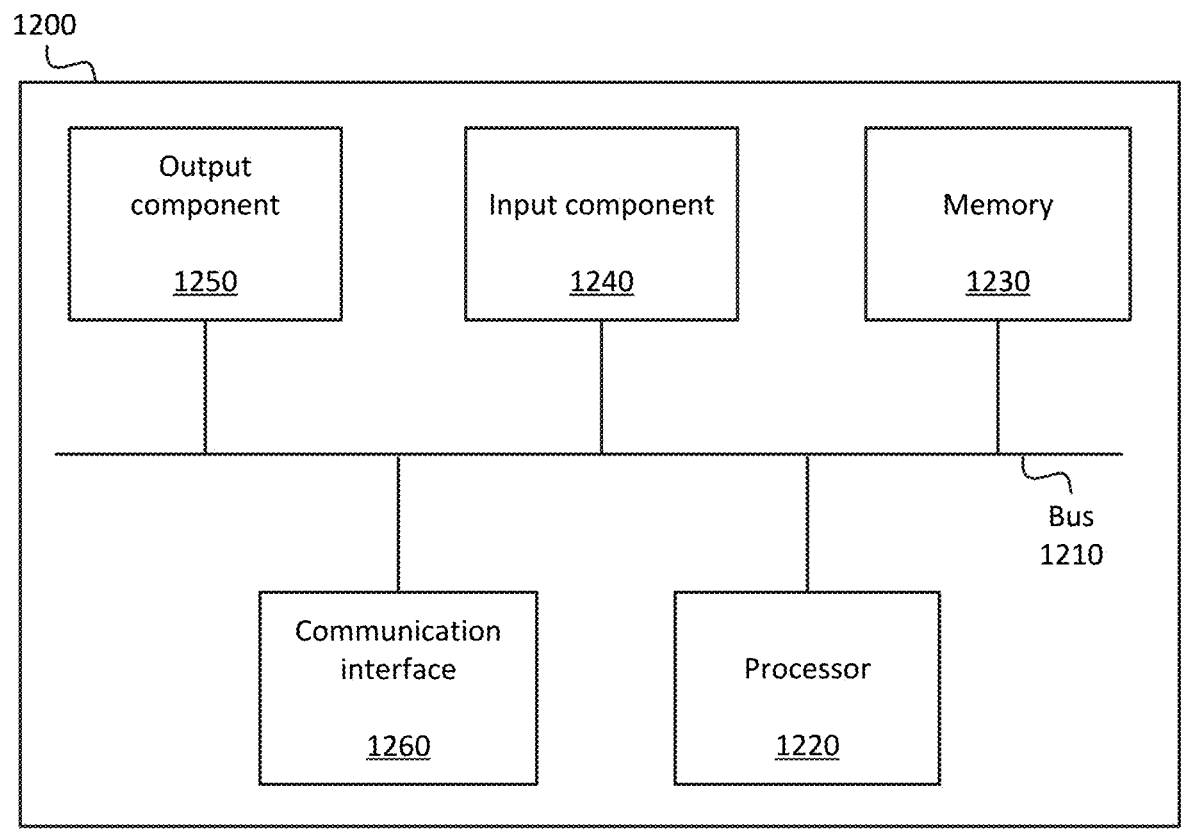
FIG. 12 illustrates example functional components of one or more devices, in accordance with one or more embodiments described herein.

FIG. 12 illustrates example components of device 1200. One or more of the devices described above may include one or more devices 1200. Device 1200 may include bus 1210, processor 1220, memory 1230, input component 1240, output component 1250, and communication interface 1260. In another implementation, device 1200 may include additional, fewer, different, or differently arranged components.

Bus 1210 may include one or more communication paths that permit communication among the components of device 1200. Processor 1220 may include a processor, microprocessor, or processing logic that may interpret and execute instructions. Memory 1230 may include any type of dynamic storage device that may store information and instructions for execution by processor 1220, and/or any type of non-volatile storage device that may store information for use by processor 1220.

Input component 1240 may include a mechanism that permits an operator to input information to device 1200, such as a keyboard, a keypad, a button, a switch, etc. Output component 1250 may include a mechanism that outputs information to the operator, such as a display, a speaker, one or more light emitting diodes ("LEDs"), etc.

Communication interface 1260 may include any transceiver-like mechanism that enables device 1200 to communicate with other devices and/or systems. For example, communication interface 1260 may include an Ethernet interface, an optical interface, a coaxial interface, or the like. Communication interface 1260 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1200 may include more than one communication interface 1260. For instance, device 1200 may include an optical interface and an Ethernet interface.

Device 1200 may perform certain operations relating to one or more processes described above. Device 1200 may perform these operations in response to processor 1220 executing software instructions stored in a computer-readable medium, such as memory 1230. A computer-readable medium may be defined as a non-transitory memory device. A memory device may include space within a single physical memory device or spread across multiple physical memory devices. The software instructions may be read into memory 1230 from another computer-readable medium or from another device. The software instructions stored in memory 1230 may cause processor 1220 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-3 and 6-9), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information provided by individuals, it should be understood that such information shall be collected, stored, and used in accordance with all applicable laws concerning protection of personal information. Additionally, the collection, storage, and use of such information may be subject to consent of the individual to such activity (for example, through "opt-in" or "opt-out" processes, as may be appropriate for the situation and type of information). Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
one or more processors configured to:
maintain information associating each call request category, of a plurality of call request categories, to a respective set of actions of a plurality of sets of actions;
receive, from a first User Equipment ("UE"), a request to establish a call between the first UE and a second UE;
identify one or more attributes associated with at least one of the first UE or the second UE;
determine, based on the one or more attributes associated with the at least one of the first UE or the second UE, that the call request is associated with a particular call request category, of the plurality of call request categories;
provide, to the second UE, a notification of the request to establish the call between the first UE and the second UE, the notification including an indication of the determined particular call request category associated with the call request, wherein providing the notification to the second UE causes the second UE to:
identify a particular set of actions associated with the particular call request category, and
present a plurality of selectable options that are each associated with a respective action of the particular set of actions;
receive, from the second UE, a response to the notification, the response indicating a selected particular action associated with a particular selectable option, of the plurality of presented selectable options, to take with respect to the call request; and
perform, based on receiving the response, the selected particular action with respect to the call request.

2. The device of claim 1, wherein the response indicates that the particular set of actions includes forgoing performing a call setup procedure between the first UE and the second UE,
wherein performing the selected particular action includes forgoing performing the call setup procedure between the first UE and the second UE.

3. The device of claim 2, wherein forgoing performing the call setup procedure between the first UE and the second UE includes forgoing outputting a Session Initiation Protocol ("SIP") INVITE message, associated with the requested call, to the second UE.

4. The device of claim 1, wherein providing the notification includes providing a Session Initiation Protocol ("SIP") NOTIFY message to the second UE.

5. The device of claim 4, wherein indication of the determined category is indicated in an "Event" field of the SIP NOTIFY message.

6. The device of claim 1, wherein the response includes a Session Initiation Protocol ("SIP") message and the particular set of actions are indicated in a body of the SIP message.

7. The device of claim 1,
wherein identifying the one or more attributes associated with at least one of the first UE or the second UE includes determining a measure of undesirability of the requested call,
wherein the call request is associated with the particular call request category associated includes identifying a particular category, of a plurality of categories that are associated with different measures of undesirability of call requests, that is associated with the determined measure of undesirability of the requested call,
wherein providing the notification to the second UE includes an indication of the determined particular category of the plurality of categories that are associated with different measures of undesirability of call requests.

8. A non-transitory computer-readable medium, storing a plurality of processor-executable instructions to:
maintain information associating each call request category, of a plurality of call request categories, to a respective set of actions of a plurality of sets of actions;
receive, from a first User Equipment ("UE"), a request to establish a call between the first UE and a second UE;
identify one or more attributes associated with at least one of the first UE or the second UE;
determine, based on the one or more attributes associated with the at least one of the first UE or the second UE, that the call request is associated with a particular call request category, of the plurality of call request categories;
provide, to the second UE, a notification of the request to establish the call between the first UE and the second UE, the notification including an indication of the determined particular call request category associated with the call request, wherein providing the notification to the second UE causes the second UE to:
identify a particular set of actions associated with the particular call request category, and
present a plurality of selectable options that are each associated with a respective action of the particular set of actions;
receive, from the second UE, a response to the notification, the response indicating a selected particular action associated with a particular selectable option, of the plurality of presented selectable options, to take with respect to the call request; and
perform, based on receiving the response, the selected particular action with respect to the call request.

9. The non-transitory computer-readable medium of claim 8, wherein the response indicates that the particular set of actions includes forgoing performing a call setup procedure between the first UE and the second UE,
wherein performing the selected particular action includes forgoing performing the call setup procedure between the first UE and the second UE.

10. The non-transitory computer-readable medium of claim 9, wherein forgoing performing the call setup procedure between the first UE and the second UE includes forgoing outputting a Session Initiation Protocol ("SIP") INVITE message, associated with the requested call, to the second UE.

11. The non-transitory computer-readable medium of claim 8, wherein providing the notification includes providing a Session Initiation Protocol ("SIP") NOTIFY message to the second UE.

12. The non-transitory computer-readable medium of claim 11, wherein indication of the determined category is indicated in an "Event" field of the SIP NOTIFY message.

13. The non-transitory computer-readable medium of claim 8, wherein the response includes a Session Initiation Protocol ("SIP") message and the one or more actions are indicated in a body of the SIP message.

14. The non-transitory computer-readable medium of claim 8, wherein identifying the one or more attributes associated with at least one of the first UE or the second UE includes determining a measure of undesirability of the requested call, wherein the call request is associated with the particular call request category associated includes identifying a particular category, of a plurality of categories that are associated with different measures of undesirability of call requests, that is associated with the determined measure of undesirability of the requested call, wherein providing the notification to the second UE includes an indication of the determined particular category of the plurality of categories that are associated with different measures of undesirability of call requests.

15. A method, comprising:

maintaining information associating each call request category, of a plurality of call request categories, to a respective set of actions of a plurality of sets of actions;

receiving, from a first User Equipment ("UE"), a request to establish a call between the first UE and a second UE;

identify one or more attributes associated with at least one of the first UE or the second UE;

determining, based on the one or more attributes associated with the at least one of the first UE or the second UE, that the call request is associated with a particular call request category, of the plurality of call request categories;

providing, to the second UE, a notification of the request to establish the call between the first UE and the second UE, the notification including an indication of the determined particular call request category associated with the call request, wherein providing the notification to the second UE causes the second UE to:

identify a particular set of actions associated with the particular call request category, and present a plurality of selectable options that are each associated with a respective action of the particular set of actions;

receiving, from the second UE, a response to the notification, the response indicating a selected particular action associated with a particular selectable option, of the plurality of presented selectable options, to take with respect to the call request; and performing, based on receiving the response, the selected particular action with respect to the call request.

16. The method of claim 15, wherein the response indicates that the particular set of actions includes forgoing performing a call setup procedure between the first UE and the second UE, wherein performing the selected particular action includes forgoing outputting a Session Initiation Protocol ("SIP") INVITE message, associated with the requested call, to the second UE.

17. The method of claim 15, wherein providing the notification includes providing a Session Initiation Protocol ("SIP") NOTIFY message to the second UE.

18. The method of claim 17, wherein indication of the determined category is indicated in an "Event" field of the SIP NOTIFY message.

19. The method of claim 15, wherein the response includes a Session Initiation Protocol ("SIP") message and the one or more actions are indicated in a body of the SIP message.

20. The method of claim 15, wherein identifying the one or more attributes associated with at least one of the first UE or the second UE includes determining a measure of undesirability of the requested call, wherein the call request is associated with the particular call request category associated includes identifying a particular category, of a plurality of categories that are associated with different measures of undesirability of call requests, that is associated with the determined measure of undesirability of the requested call, wherein providing the notification to the second UE includes an indication of the determined particular category of the plurality of categories that are associated with different measures of undesirability of call requests.

* * * * *